United States Patent
Do et al.

[11] Patent Number: 5,957,560
[45] Date of Patent: Sep. 28, 1999

[54] LIGHT SHUTTER PROJECTOR WITH A FLUORESCENT SCREEN

[75] Inventors: Young-rag Do; Chang-won Park; Jang-ho Kim; Jae-woo Bae, all of Suwon-si; Joon-bae Lee, Seoul, all of Rep. of Korea

[73] Assignee: Samsung Display Devices Co., Ltd., DPR of Korea

[21] Appl. No.: 08/954,268

[22] Filed: Oct. 20, 1997

[30] Foreign Application Priority Data

Dec. 12, 1996 [KR] Rep. of Korea .................. 96-64633

[51] Int. Cl.⁶ .................................. G03B 21/14
[52] U.S. Cl. ...................... 353/88; 353/84; 353/20; 348/760
[58] Field of Search .................. 353/20, 84, 122, 353/31, 88, 121; 349/70, 71; 348/760, 800, 803, 804, 776, 778, 779, 780, 781, 782, 786, 787

[56] References Cited

U.S. PATENT DOCUMENTS

| | | |
|---|---|---|
| 3,918,803 | 11/1975 | Friesem ................................ 353/84 |
| 4,714,956 | 12/1987 | Yin . |
| 4,737,840 | 4/1988 | Morishita . |
| 4,872,750 | 10/1989 | Morishita ................................ 353/7 |
| 5,015,999 | 5/1991 | Imai et al. . |
| 5,473,396 | 12/1995 | Okajima et al. ........................ 353/122 |

*Primary Examiner*—William Dowling
*Attorney, Agent, or Firm*—Christie, Parker & Hale, LLP

[57] ABSTRACT

Disclosed is a ferroelectric liquid crystal display projector employing a fluorescent screen, including a light source emitting light of a predetermined wavelength; a first condensing lens for converting the light radiated from the light source into beams; a polarizing beam splitter for selecting a predetermined directional light in the incident light passing through the first condensing lens and for polarizing the light; a ferroelectric liquid crystal shutter on/off operated according to the polarizing operation of the polarizing beam splitter, the ferroelectric liquid crystal shutter comprising a reflecting layer attached on a backside and RAM devices attached on each pixel of a ferroelectric liquid crystal (FLC); an optical system for magnifying, at a predetermined ratio, the light reflected from the ferroelectric liquid crystal shutter; and a fluorescent screen of a fluorescent material which radiates by light, passing through the optical system, at a predetermined wavelength.

16 Claims, 7 Drawing Sheets

250nm

LIGHT SHUTTER PROJECTOR WITH A FLUORESCENT SCREEN

FIELD OF THE INVENTION

The present invention relates to a light shutter projector with a fluorescent screen, which improves picture quality and brightness, and widens user viewing range by utilizing a fluorescent screen deposited with a fluorescent layer irradiatated by light of a predetermined wavelength, and a ferroelectric liquid crystal shutter.

BACKGROUND OF THE INVENTION

Generally, projectors are devices for projecting an image on a picture screen. Projectors are classified into two types: color cathode-ray tube projectors displaying an image by radiating light emitted from red R, green G, and blue B cathode-ray tubes through an optical system; and projectors using a reflection-type ferroelectric liquid crystal display shutter employing random access memory(RAM) devices.

Referring to FIG. 9 illustrating a projector employing a ferroelectric liquid crystal display shutter, the projector comprises red R, green G, and blue B light sources 2, a first condensing lens 4 for converting light radiated from the light sources 2, a diffuser 5 for diffusing the beams, a polarizing beam splitter(PBS) 6 for selecting and polarizing a predetermined directional light in the incident light passing through the first condensing lens 4 and the diffuser 5, a ferroelectric liquid crystal(FLC) shutter 8 on/off operated according to the polarizing operation of the PBS 6 and comprising a reflecting layer attached a side opposite that facing the PBS 6(backside) and a very large scale integrated (VLSI) circuit having RAM devices attached on each pixel, and an optical system 10 for magnifying and projecting at a predetermined ratio the light reflected from the ferroelectric liquid crystal shutter 8 on a picture screen.

A variety of lamps able to emit white light, e.g., light emitting diodes or metal halide lamps, may be used for the light sources 2.

The ferroelectric liquid crystal shutter 8 includes FLC pixels each having a RAM device attached thereon, and an aluminum (Al) reflecting layer attached on the backside of the shutter 8.

The ferroelectric liquid crystal shutter 8 is on/off operated according to the polarizing operation of the PBS 6 by adjusting an optical axis exterior electric field of the FLC.

The optical system 10 magnifies the image obtained from the ferroelectric liquid crystal shutter 8 through a lens system, then projects the magnified image on a picture screen, thereby obtaining an image of a reflection-type active matrix ferroelectric liquid crystal projection display.

The projector using the reflection-type ferroelectric liquid crystal shutter 8 employing RAM devices may display natural colors such as red R, green G, and blue B by utilizing a time-sharing operation. This type of projector may solve the problem of the response speed when obtaining a dynamic picture image since the projector has the advantages both of the active matrix actively operating each pixel of the ferroelectric liquid crystal by employing RAM devices and of the ferroelectric liquid crystal display having a rapid response speed. As a result, three reflection-type shutters for red R, green G, and blue B are not required but only one shutter is enough to realize images with the red R, green G, and blue B colors. Accordingly, the structure of the projector is simplified and manufacturing costs are reduced.

However, drawbacks remain in the above described conventional projector. Namely, because a reflection-type image is projected, a user viewing range is limited, the image appearing unclear and deformed at some angles, and brightness is reduced.

Further, the conventional projector passively emits light. That is, since the image is obtained by reflection or transmission and not by active emission of pixels, user viewing range, picture quality, and brightness are negatively affected. As a result, the conventional projector cannot be used for small-sized projectors but only for large-sized projectors having a screen size of 40 inches or more.

SUMMARY OF THE INVENTION

The present invention has been made in an effort to solve the above problems.

It is an object of the present invention to provide a light shutter projector which improves picture quality and brightness, and widens a user viewing range by employing a fluorescent screen which irradiated by light of a predetermined wavelength such that the projector is applicable to both large and small-sized projectors.

To achieve the above object, the present invention provides a light shutter projector, comprising a light shutter projector, comprising: a light source emitting light of a predetermined wavelength; a first condensing lens for converting the light radiated from the light source into beams; a polarizing beam splitter for selecting a predetermined directional light in the incident light passing through the first condensing lens and for polarizing the light; a light shutter display assembly on/off operated according to the polarizing operation of the polarizing beam splitter; a screen/optical assembly having an optical system and a fluorescent screen.

It is preferable that the light emitted from the light source has a wavelength within the range of 300 nm to 450 nm.

It is also preferable that the polarizing beam splitter has double refractivity and is made of transparent material suitable for ultraviolet rays.

The light shutter display assembly is on/off operated in accordance with the polarizing operation of the polarizing beam splitter, the light shutter displayer assembly comprising a light display shutter and a reflecting layer attached on a side of the light display shutter opposite that facing the polarizing beam splitter.

The light display shutter is selected from the group consisting of a ferroelectric liquid crystal display shutter with a random access memory, a thin film transistor liquid crystal shutter, and a digital mirror display shutter.

According to one aspect of the present invention the optical system is disposed between the fluorescent screen and the polarizing beam splitter.

According to another aspect of the present invention the fluorescent screen is disposed between the optical system and the polarizing beam splitter.

The fluorescent screen is formed such that the light, reflected from each pixel of the reflecting layer, exactly corresponds to fluorescent material through the optical system.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF PREFERRED EMBODIMENTS

Preferred embodiments of the present invention will now be described in detail with reference to the accompanying drawings.

Figure 1:
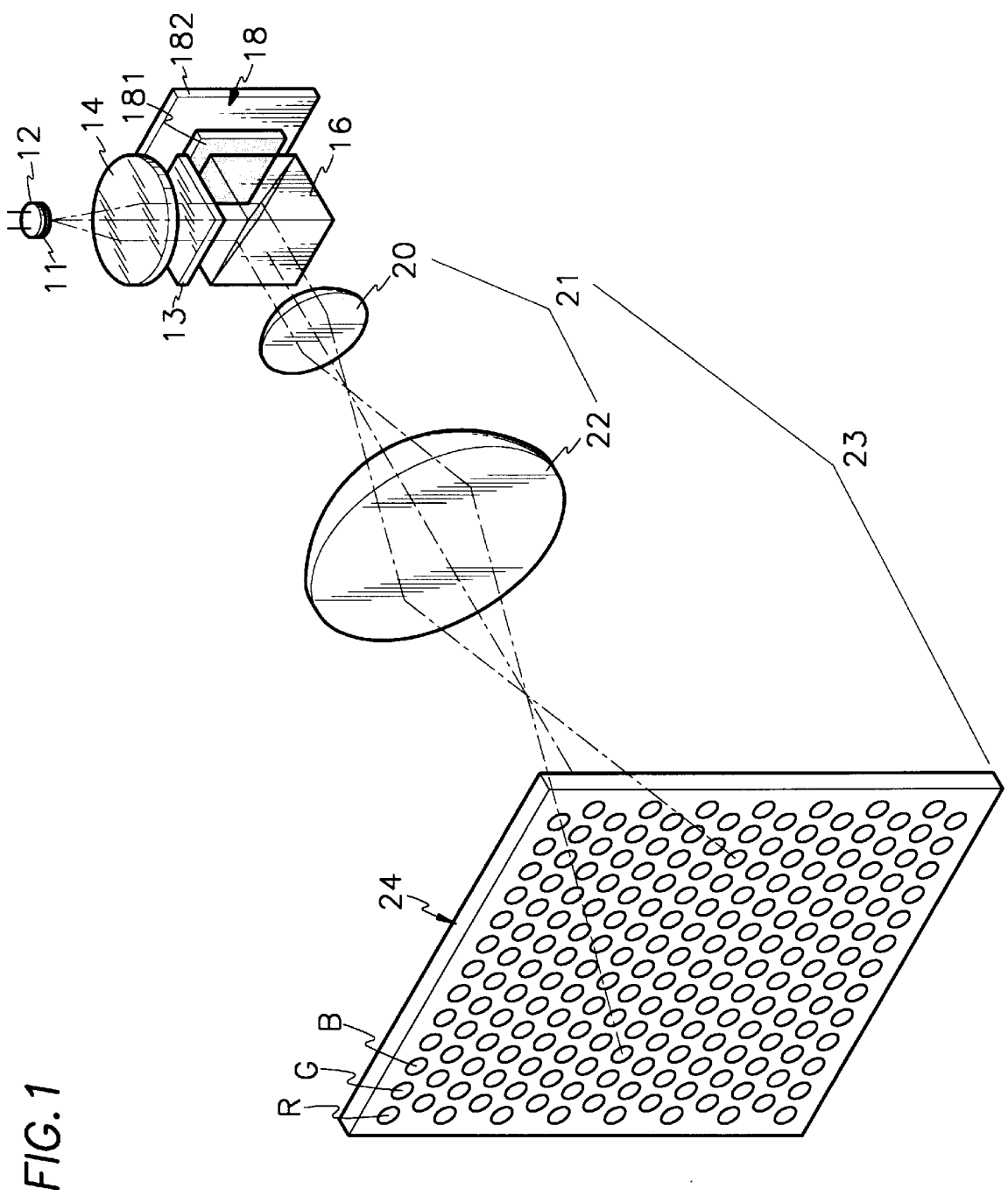
FIG. 1 is a schematic perspective view showing a light shutter projector with a fluorescent screen according to a preferred embodiment of the present invention.

Referring to FIG. 1, a light shutter projector with a fluorescent screen according to a first embodiment of the present invention comprises a light source 12 emitting light of a predetermined wavelength; a first condensing lens 14 for converting the light radiated from the light source 12 into beams; a diffuser 13 for diffusing light from the first condensing lens 14; a polarizing beam splitter 16 for selecting and polarizing a predetermined directional light in the incident light passing through the diffuser 15; a light shutter assembly 18 having a display light shutter 181 and a reflecting layer 182, which is on/off operated according to the polarizing operation of the polarizing beam splitter 16; and an optical/screen assembly 23 having a fluorescent screen 24 deposited with fluorescent material which illuminates by the light, passing through the optical system 21, of a predetermined wavelength and an optical system 21 disposed between the screen 24 and the polarizing beam splitter 16 for magnifying, at a predetermined ratio, the light reflected from the light shutter assembly 18.

It is preferable that the light source 12 emits light at a wavelength within the range of 300 to 450 nm. Within this range, the light source 12 emits light(i.e., ultraviolet rays) at a wavelength that does not damage the light display shutter 181 while being sufficient to excite the phosphor layer deposited on the fluorescent screen 24. For this purpose, the light source 12 is provided with a color glass or a filter 11 for allowing the passage only of light of a wavelength within the range of 300 to 450 nm.

When using color glass, it is preferable to add cobalt(Co), nickel(Ni), and iron(Fe) to lead glass so that visible light can be removed; and when using a filter it is preferable to use a band pass filter or a cutoff filter, which remove visible light and ultraviolet rays having a short wavelength.

Preferably, either a metal halide lamp, a mercury discharge lamp, an inert gas discharge lamp, a fluorescent lamp, or a luminescent diode lamp is used for the light source 12 depending on picture screen size. The light source 12 is preferably made of one or more materials which allow the emission of light in a wavelength range(i.e., 300–450 nm) to excite the phosphor layer while not damaging the light display shutter 181, such as cadmium Cd, cesium Cs, helium He, cadmic hydrargyrum HgCd, kalium K, sodium Na, neon Ne, titanium Ti, zinc Zn, hydrargyrum Hg, argon Ar, or xenon Xe.

The polarizing beam splitter 16 is preferably made of transparent material suitable for use with ultraviolet rays and having double refractivity, such as crystal quartz, sapphire, mica, or calcite.

The incident light radiated into the polarizing beam splitter 16 is reflected or transmitted. Here, reflexibility and transmissibility is adjusted according to a coating degree of a reflecting surface of the polarizing beam splitter 16, which is formed by coupling two prisms together. The polarizing beam splitter 16 reflects s-polarized light or p-polarized light into the light display shutter assembly 18.

The light display shutter 181 is selected from the group consisting of a ferroelectric liquid crystal display shutter with a random access memory, a thin film transistor liquid crystal shutter, and a digital mirror display shutter. The light display shutter assembly 18 is on/off operated according to the polarizing operation of the polarizing beam splitter 16 such that the light polarized through the polarizing beam splitter 16 passes through the light display shutter 181, is reflected from the reflecting layer 182, and directed again into the polarizing beam splitter 16. Here, if the light display shutter 181 is a ferroelectric liquid crystal display, RAM devices are attached to each pixel allowing operation of each pixel at a rapid speed (approximately 50 $\mu s$).

The reflecting layer 182 is preferably made of material allowing optimum reflection of the incident light through the ferroelectric liquid crystal display such as aluminum Al, aluminum coated with fluoric magnesium MgF2, or aluminum coated with monoacidic silicon SiO.

The optical system 21 used in the present invention is similar to the widely-used lens system, and is determined according to the size of the picture screen and the shutter.

The optical system 21 comprises a second condensing lens 20 for converting the beams passing through the polarizing beam splitter 16 into radiated light, and a projecting lens 22 for magnifying the radiated light passing through the second condensing lens 20 and projecting the light to the fluorescent screen 24.

Figure 2:
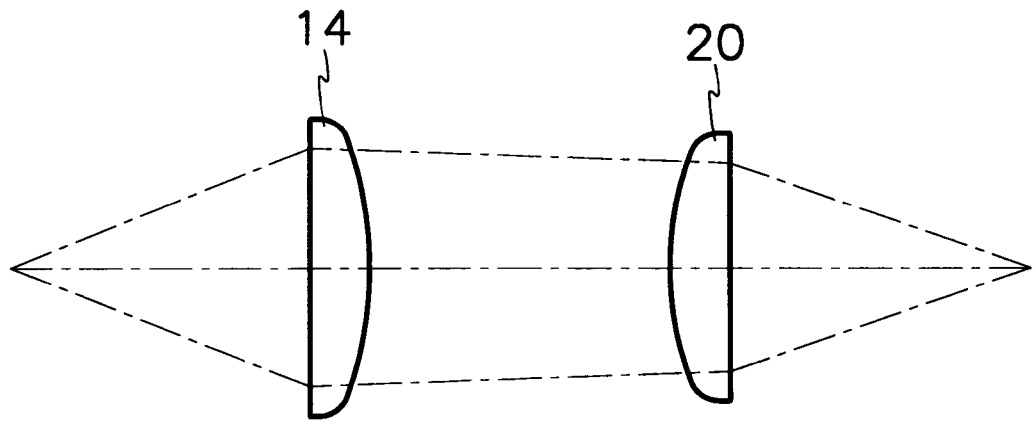
FIG. 2 is a front view used for explaining an operation of first and a second condensing lenses shown in FIG. 1.

As shown in FIG. 2, the first and the second condensing lenses 14 and 20 convert the beams into radiated light or vice versa. Since the light passes the polarizing beam splitter 16 and the light display shutter assembly 18 in a parallel state, the light is uniformly transmitted, thereby reducing light loss and allowing for the on/off operation in an optimum state. Focal distances of the first and the second condensing lenses 14 and 20 are determined according to an entire size of the device and a distance of the light path.

The first and the second condensing lenses 14 and 20 and the projecting lens 22 are preferably made of material suitable for ultraviolet rays having a wavelength within the range of 300 nm to 450 nm, such as fused silica, quartz, BK7 (trademark name), poly methyl methacrylate PMMA, fluoric calcium CaF2, or fluoric magnesium MgF2.

Figure 3:
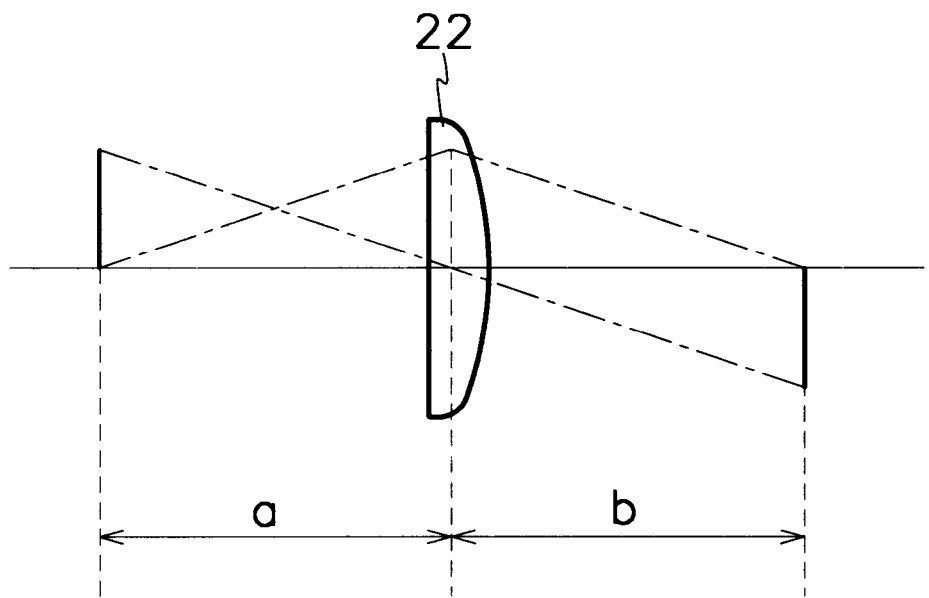
FIG. 3 is a front view used for explaining an operation of a projecting lens shown in FIG. 1.

Referring to FIG. 3, the projecting lens 22, as an optical device for magnifying or reducing, uses mirrors or optical lenses and can either be a reflecting type(front type) or a transmitting type(rear type), and its magnification M is obtained by dividing the size of an image by the size of an object. A focal distance of the projecting lens 22 is obtained by using one of the following formulas: $1/a + 1/b = 1$ or $M = b/a$.

Referring back to FIG. 1, the fluorescent screen 24 is formed such that the light, reflected from pixels of the reflecting layer of the light display shutter 181, precisely lands on and excites the corresponding fluorescent material through the optical system.

The fluorescent screen 24 is formed by using a photolithography method, a slurry spin coating method, or a pressing method, all of which are used for forming a phosphor layer in conventional cathode-ray tubes or plasma display panels (PDPs).

Namely, a sensitive resin pattern is first formed through the steps of cleaning a glass plate; depositing a photo sensitive resin consisting of acryl emulsion, pure water, a polymer of poly plastic alcohol, sodium dichromate, polymer of propylene oxide, and ethylene oxide, on an inner surface of the glass plate; and drying and developing the sensitive resin. Then, a black matrix layer for interrupting the exterior light and preventing color mixture is formed in a predetermined pattern by depositing black lead on the sensitive resin pattern and by removing the sensitive resin by etching using hydrogen peroxide. Subsequently, a first phosphor slurry including first phosphor particles, pure water, and poly vinyl alcohol is deposited on the black matrix layer, and the first phosphor is formed through the process of drying, exposure, developing, cleaning, and drying. Then, through the same process, second and third fluorescent layers are formed to make the fluorescent screen.

The most efficient phosphors of red R, green G, and blue B are preferably used according to spectrum dispersion, the dispersion pattern being changed by the size of the picture screen and type of light.

The red R fluorescent material having a wavelength within the range of 300 nm to 450 nm can be selected from the group consisting of $Y_2O_2S:Eu^{3+}$, $La_2O_2S:Eu^{3+}$, $Y_2O_3:Eu^{3+}$, $3.5MgO.0.5MgF_2.GeO_2:Mn^{4+}$, $YVO_4:Eu^{3+}$, $SrY_2S_4:Eu^{2+}$, and $K_5Eu(WO_4)_4$;

the green G fluorescent material can be selected from the group consisting of $SrAl_2O_4:Eu^{2+}$, $SrGa_2S_4:Eu^{2+}$, $Y_3Al_5O_{12}:Ce^{3+}$, Zns:Cu, ZnS:(Cu,Al), ZnS:(Cu,Al,Au), $Zn_2GeO_4:Mn^{2+}$, $(Ca,Mg,Sr)_3MgSi_2O_8: Eu^{2+}$, $(Ca,Mg,Sr)SiO_4:Eu^{2+}$, $La_2O_2S:Tb^{3+}$, and $Y_2O_2S:Tb^{3+}$; and the blue B fluorescent material can be selected form the group consisting of $Sr_{10}(PO_4)_6Cl_2:Eu^{2+}$, $(Sr_{0.9}Ca_{0.1})_{10}(PO_4)_6C_{12}:Eu^{2+}$, $BaMg_2Al_{16}O_{27}:Eu^{2+}$, $Sr_3MgSi_2O_8:Eu^{2+}$+, $Ba_3MgSi_2O_8:Eu^{2+}$+, ZnS:(Ag,Cl), ZnS:(Ag,Al), and Zns:(Ag,Ga).

The light shutter projector employing the inventive fluorescent screen 24 displays an image by passing an image, obtained when light having a wavelength in a predetermined range(e.g., ultraviolet rays) advances through the light display shutter assembly 18, through the second condensing lens 20 and the projecting lens 22 such that the light is radiated to correspond to the fluorescent material deposited on the fluorescent screen 24 in a predetermined pattern. That is, the image is displayed by means of exactly corresponding the pixels of the light display shutter 18 to the pixels of the fluorescent screen 24 by adjusting the second condensing lens 20 and the projecting lens 22.

To prevent color mixture, the second condensing lens 20 and the projecting lens 22 are preferably designed so as to excite only 90–95% of the size of each pixel in the fluorescent screen 24.

Also to prevent color mixture, it is possible to insert a mask between the fluorescent screen 24 and the optical system. The mask is preferably made of materials that are resistant to ultraviolet rays and absorb visible rays (e.g., steel or metal, or color plastic material), and is formed in a predetermined pattern having holes for the passage of light.

Figure 4:
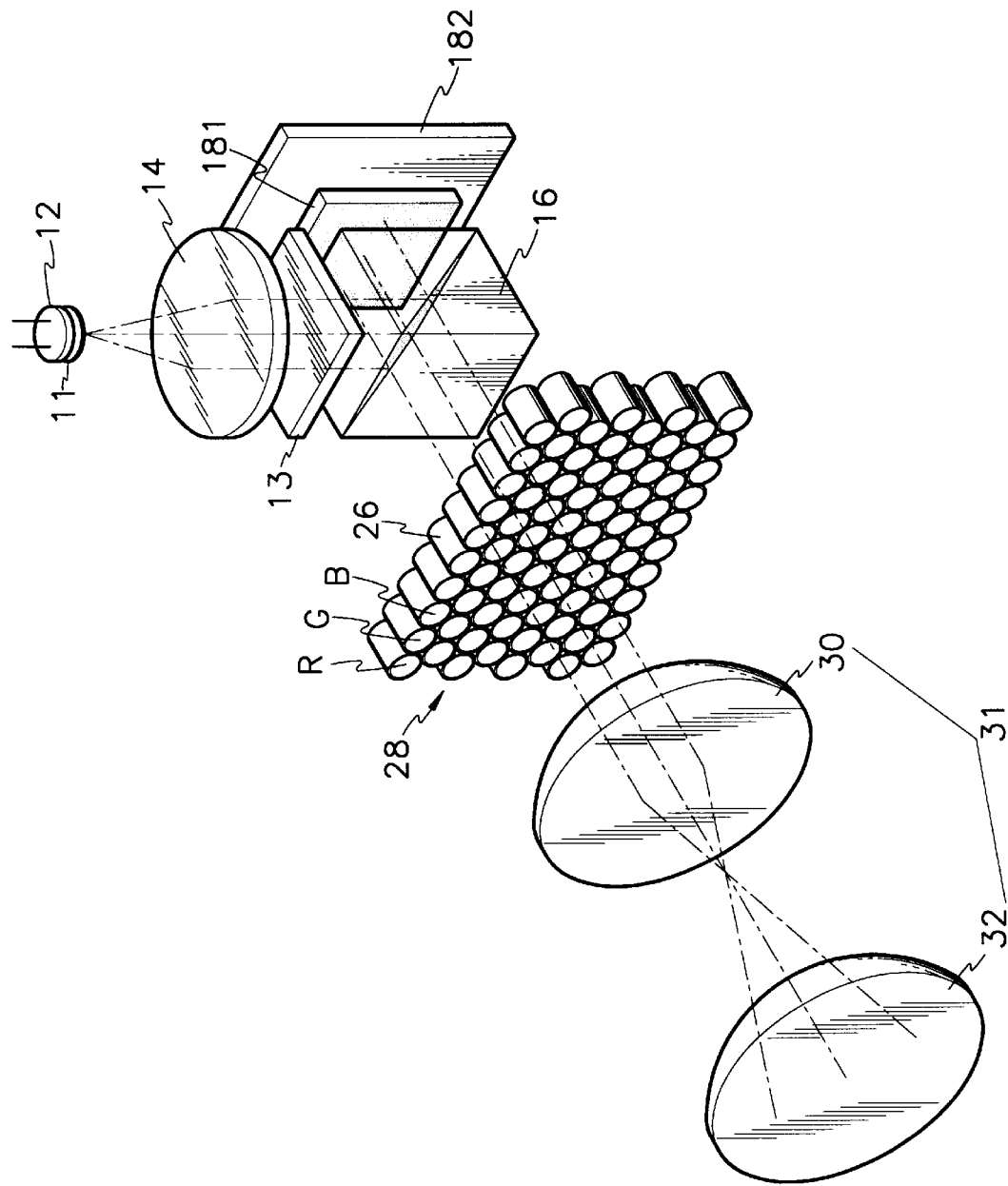
FIG. 4 is a schematic perspective view showing a light shutter projector with a fluorescent screen according to another embodiment of the present invention.

Referring to FIG. 4, there is shown a light shutter projector employing a fluorescent screen according to a second embodiment of the present invention. One difference of this embodiment from the first embodiment is that a fluorescent screen 28 is formed by a bundle of optical fibers 26 each operating as a pixel, the fluorescent screen 28 being deposited with a fluorescent material which irradiates by light, reflected from the light display shutter 181, at a predetermined wavelength. Another difference is that an optical system 31 comprises a second condensing lens 30 for converting the beams passing through the fluorescent screen 28 into radiated light, and an eye-lens 32 for magnifying or reducing the light concentrated through the second condensing lens 30.

Figure 6:
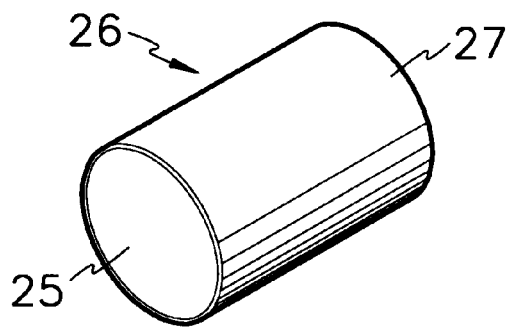
FIG. 6 is a front view used for explaining an optical fiber shown in FIG. 4.

As shown in FIG. 6, the optical fibers 26 are composed of a core 25 deposited with a fluorescent material, and a coating material 27 covering the core 25 to prevent color mixture of the fluorescent material deposited on the core 25.

The optical fibers 26 forming the fluorescent screen 28 in the form of a bundle are preferably made of material having high transmissibility of ultraviolet rays, such as high grade fused silica or liquid glass, wherein the materials each having a different refractive index are respectively applied to the core 25 and the covering material 27.

Figure 5:
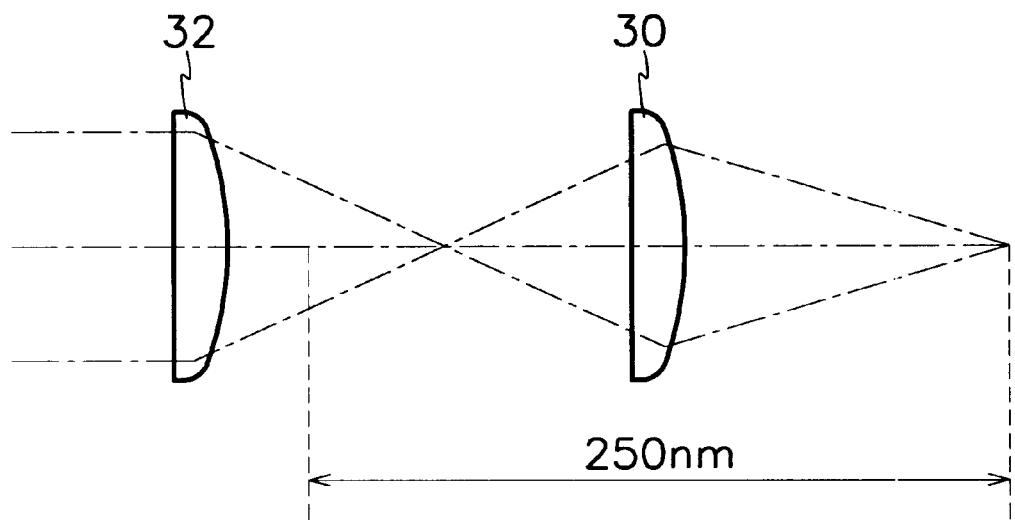
FIG. 5 is a front view used for explaining an operation of an eye-lens shown in FIG. 4.

As shown in FIG. 5, the eye-lens 32 of the optical system 31 is an optical device that magnifies or reduces the image, formed on the fluorescent screen 28, to a ghost image keeping a visible range, wherein the eye-lens 32 is preferably made of material which is suitable for light having a wavelength within the range of 400 nm to 780 nm. The eye-lens 32 is advantageously varied in its magnification by using one to three lenses which are slim, light, and small so as to select several magnifications or reductions according to the size of the picture screen, or by employing a changeable adapter or a zoom lens. Here, the focal distance of the eye-lens 32 is obtained by dividing the minimum distance of distinct vision by the magnification of the eye-lens: since the minimum distance of distinct vision is 250 mm, the formula can be expressed as: 250/magnification of the eye-lens.

Figure 7:
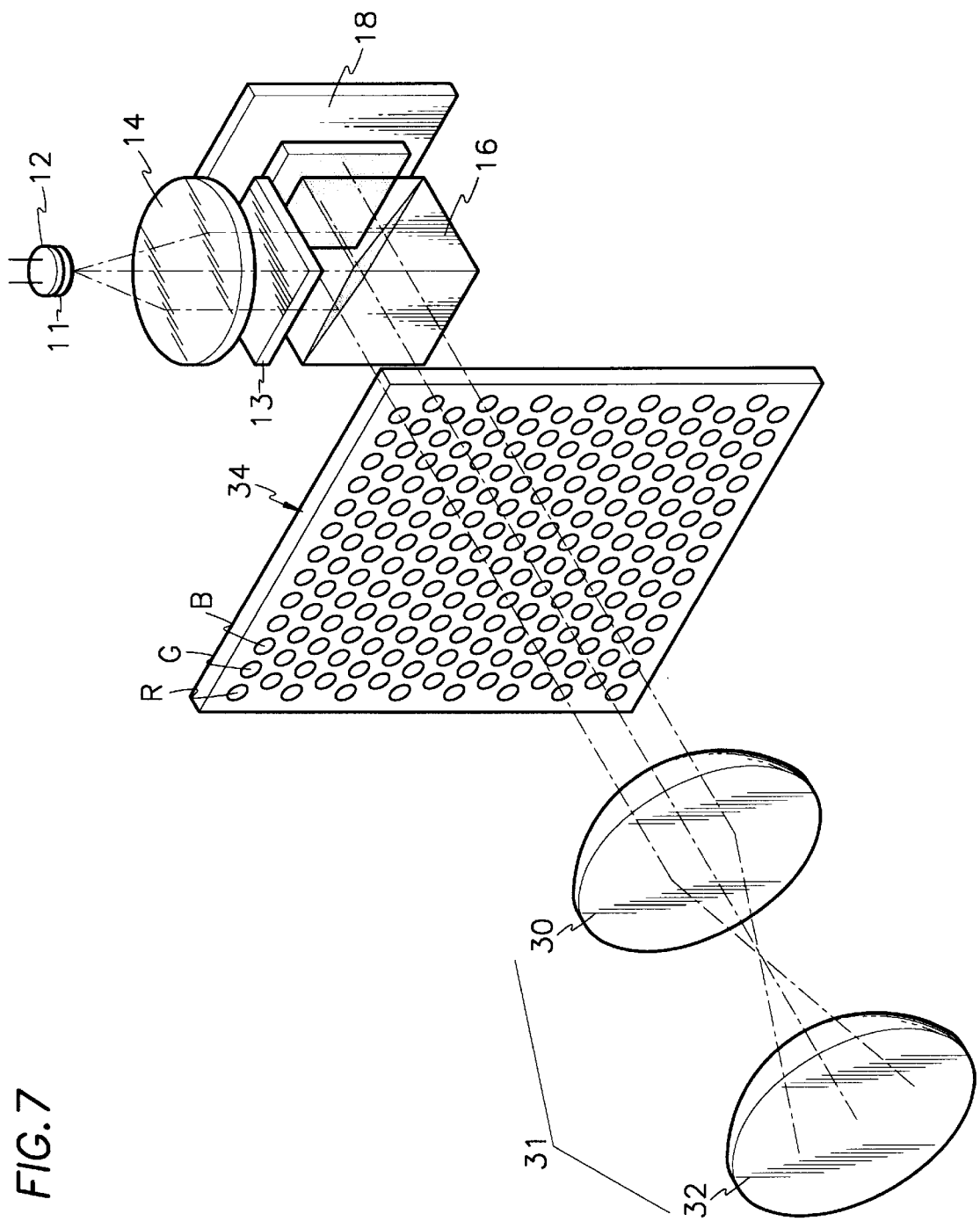
FIG. 7 is a schematic perspective view showing a light shutter projector with a fluorescent screen according to still another embodiment of the present invention.

Referring to FIG. 7, there is shown a view illustrating a light shutter projector employing a fluorescent screen according to a third embodiment of the present invention. The difference of this embodiment from the second embodiment is that a fluorescent screen 34 layered with a fluorescent material is used.

Figure 8:
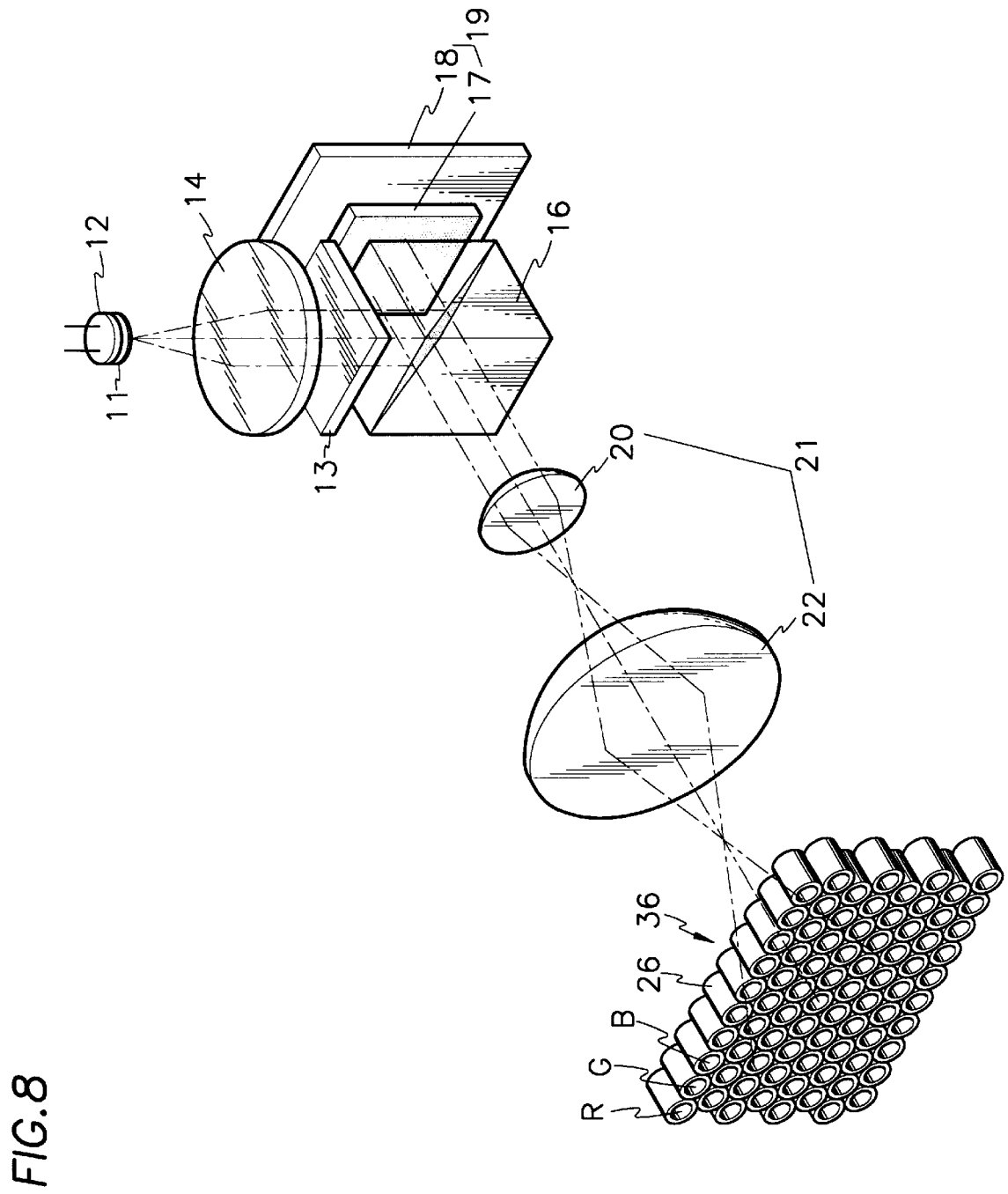
FIG. 8 is a schematic perspective view showing a light shutter projector with a fluorescent screen according to still another embodiment of the present invention.
Figure 9:
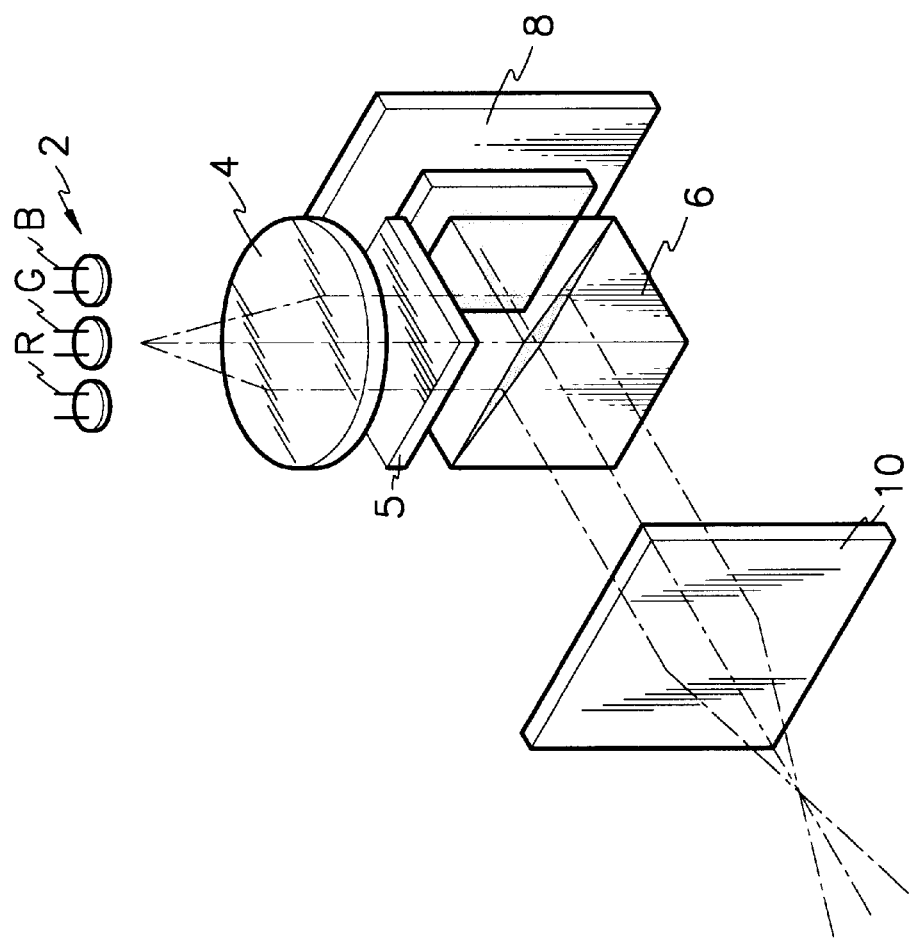
FIG. 9 is a schematic perspective view showing a conventional ferroelectric liquid crystal display projector.

Referring to FIG. 8, there is shown a view illustrating a light shutter projector according to a fourth embodiment similar to the second embodiment.

The difference of this embodiment from the second embodiment is that the optical system 21 is disposed between a screen 36 formed by a bundle of optical fibers 26 and the beam splitter 16.

In the projector employing the inventive fluorescent screen, picture quality and brightness and improved and user viewing range is widened by use of a fluorescent screen.

Further, with the use of an inexpensive and easy-to-manufacture shutter, a thin film transistor liquid crystal shutter, or digital mirror display shutter which has good reflective efficiency, it is possible to apply the present invention to small-sized display devices such as a portable computer monitor or a display device for a vehicle navigation system, etc.

Further, if a fluorescent screen is used in which a bundle of optical fibers are formed having fluorescent material deposited thereon, as it is possible for the size of the optical fibers to correspond to that of the pixels at a 1:1 ratio or at a magnified or reduced ratio, resolution and brightness can be improved, and because the fluorescent material is deposited only on the core of the fibers and the covering material covers the core, color mixture when emitting red, green, and blue light is prevented such that brightness is improved.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A light shutter projector, comprising:
   a light source emitting light of a predetermined wavelength;
   a first condensing lens for converting the light emitted from the light source into a plurality of beams;
   a polarizing beam splitter for selecting a polarized light component from said plurality of beams passing through the first condensing lens;
   a light shutter display assembly operating in on/off states, receiving the polarized light component from the polarizing beam splitter, and selectively reflecting portions of the polarized light component based on a status of the on/off states;
   a screen/optical assembly receiving said reflected portions of the polarized light component and having an optical system and a fluorescent screen.

2. The projector of claim 1, wherein the light emitted from the light source has a wavelength within the range of 300 nm to 450 nm.

3. The projector of claim 1, wherein the polarizing beam splitter has double refractivity and is made of a transparent material suitable for polarizing ultraviolet rays.

4. The projector of claim 1, wherein the light shutter display assembly comprises a light display shutter and a reflecting layer attached on a side of the light display shutter opposite that facing the polarizing beam splitter.

5. The projector of claim 1, wherein the light display shutter is selected from the group consisting of a ferroelectric liquid crystal display shutter with a random access memory, a thin film transistor liquid crystal shutter, and a digital mirror display shutter.

6. The projector of claim 1, wherein the optical system is disposed between the fluorescent screen and the polarizing beam splitter.

7. The projector of claim 1, wherein the fluorescent screen is disposed between the optical system and the polarizing beam splitter.

8. The projector of claim 6, wherein the optical system comprises a second condensing lens for converting the beams passing through the polarizing beam splitter into radiated light, and a projecting lens for magnifying the radiated light passing through the second condensing lens and for projecting the light to the fluorescent screen.

9. The projector of claim 1, wherein the light shutter display assembly comprises a reflecting layer having a plurality of pixels, and the fluorescent screen has a fluorescent material having a plurality of pixels deposited thereon, such that the light, reflected from each pixel of the reflecting layer, is passed to a corresponding pixel of the fluorescent material through the optical system.

10. The projector of claim 1, wherein the fluorescent screen has a fluorescent material deposited thereon, and said fluorescent material radiates light of a wavelength within the range of 300 nm to 450 nm.

11. The projector of claim 1, wherein the fluorescent screen has a fluorescent material deposited thereon, and said fluorescent material comprises three color components, red (R), green (G) and blue (B), wherein the fluorescent material for each color component is selected from the group consisting of:

$Y_2O_2S:Eu^{3+}$, $La_2O_2S:Eu^{3+}$, $Y_2O_3:Eu^{3+}$, $3.5MgO.0.5MgF_2.GeO_2:Mn^{4+}$, $YVO_4:Eu^{3+}$, $SrY_2S_4:Eu^{2+}$, and $K_5Eu(WO_4)_4$ for red (R) fluorescent material;

$SrAl_2O_4:Eu^{2+}$, $SrGa_2S_4:Eu^{2+}$, $Y_3Al_5O_{12}:Ce^{3+}$, Zns:Cu, ZnS: (Cu,Al), ZnS: (Cu,Al,Au), $Zn_2GeO_4:Mn^{2+}$, (Ca,Mg,Sr) $MgSi_2O_8:Eu^{2+}$, $(Ca,Mg,Sr)SiO_4:Eu^{2+}$, $La_2O_2S:Tb^{3+}$, and $Y_2O_2S:Tb^{3+}$, for green (G) fluorescent material; and $Sr_{10}(PO_4)_6Cl_2:Eu^{2+}$, $(Sr_{0.9},Ca_{0.1})_{10}(PO_4)_6C_{12}:Eu^{2+}$, $BaMg_2Al_{16}O_{27}:Eu^{2+}$, $Sr_3MgSi_2O_8:Eu^{2+}$, $Ba_3MgSi_2O_8Eu^{2+}$, ZnS: (Ag,Cl), ZnS: (Ag,Al), and Zns:(Ag,Ga) for blue (B) fluorescent material.

12. The projector according to claim 1, wherein the fluorescent screen is formed of a bundle of optical fibers each operating as a pixel.

13. The projector according to claim 12, wherein each of the optical fibers comprises a core on which fluorescent material is deposited and a coating material covering the core to prevent color mixture when the fluorescent material deposited on the core emits light.

14. The projector of claim 12, wherein the optical fibers are made of material having high transmissibility of ultraviolet rays, and materials each having a different refractive index are respectively applied to a core and a covering material.

15. The projector of claim 7, wherein the optical system comprises a second condensing lens for converting the beams passing through the fluorescent screen into radiated light, and an eye-lens for magnifying or reducing the light concentrated through the second condensing lens.

16. The projector of claim 15, wherein the eye-lens is made of material suitable for magnifying or reducing light of a wavelength within the range of 400 nm to 780 nm.

* * * * *